United States Patent
Endo et al.

(10) Patent No.: US 7,678,502 B2
(45) Date of Patent: *Mar. 16, 2010

(54) ALKALINE STORAGE CELL AND HYDROGEN STORAGE ALLOY FOR NEGATIVE ELECTRODE OF ALKALINE STORAGE CELL

(75) Inventors: Takahiro Endo, Takasaki (JP); Masaru Kihara, Takasaki (JP); Tatsuya Aizawa, Takasaki (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 494 days.

This patent is subject to a terminal disclaimer.

(21) Appl. No.: 11/523,787

(22) Filed: Sep. 20, 2006

(65) Prior Publication Data

US 2007/0065722 A1 Mar. 22, 2007

(30) Foreign Application Priority Data

Sep. 21, 2005 (JP) .............................. 2005-274018

(51) Int. Cl.
*H01M 4/58* (2006.01)

(52) U.S. Cl. .................... 429/218.2; 429/215; 429/223; 429/231.6; 429/218.1; 420/900

(58) Field of Classification Search .............. 429/218.2, 429/215, 223, 231.6, 218.1; 420/900
See application file for complete search history.

(56) References Cited

U.S. PATENT DOCUMENTS

2004/0134569 A1    7/2004   Yasuoka et al.
2006/0057019 A1*   3/2006   Young et al. ................ 420/455

FOREIGN PATENT DOCUMENTS

| CN | 1510774 A1 | | 7/2004 |
|---|---|---|---|
| JP | 2001316744 A | | 11/2001 |
| JP | 2002105564 A | | 4/2002 |
| JP | 2002-164045 A | | 6/2002 |
| JP | 2004273346 A | | 9/2004 |
| JP | 2006127817 | * | 5/2006 |

* cited by examiner

*Primary Examiner*—Laura S Weiner
(74) *Attorney, Agent, or Firm*—Westerman, Hattori, Daniels & Adrian, LLP

(57) ABSTRACT

An alkaline storage cell has a positive electrode, a negative electrode containing a hydrogen storage alloy, and an alkaline electrolyte. The hydrogen storage alloy has a composition expressed by a general expression: $((PrNd)_\alpha Ln_{1-\alpha})_{1-\beta} Mg_\beta Ni_{\gamma-\delta-\epsilon} Al_\delta T_\epsilon$, where Ln represents at least one element chosen from a group consisting of La, Ce, etc., T represents at least one element chosen from a group consisting of V, Nb, etc., and subscripts $\alpha$, $\beta$, $\gamma$, $\delta$ and $\epsilon$ represent numerical values which satisfy $0.7<\alpha$, $0.05<\beta<0.15$, $3.0 \leqq \gamma \leqq 4.2$, $0.15 \leqq \delta \leqq 0.30$ and $0 \leqq \epsilon \leqq 0.20$.

16 Claims, 1 Drawing Sheet

FIGURE
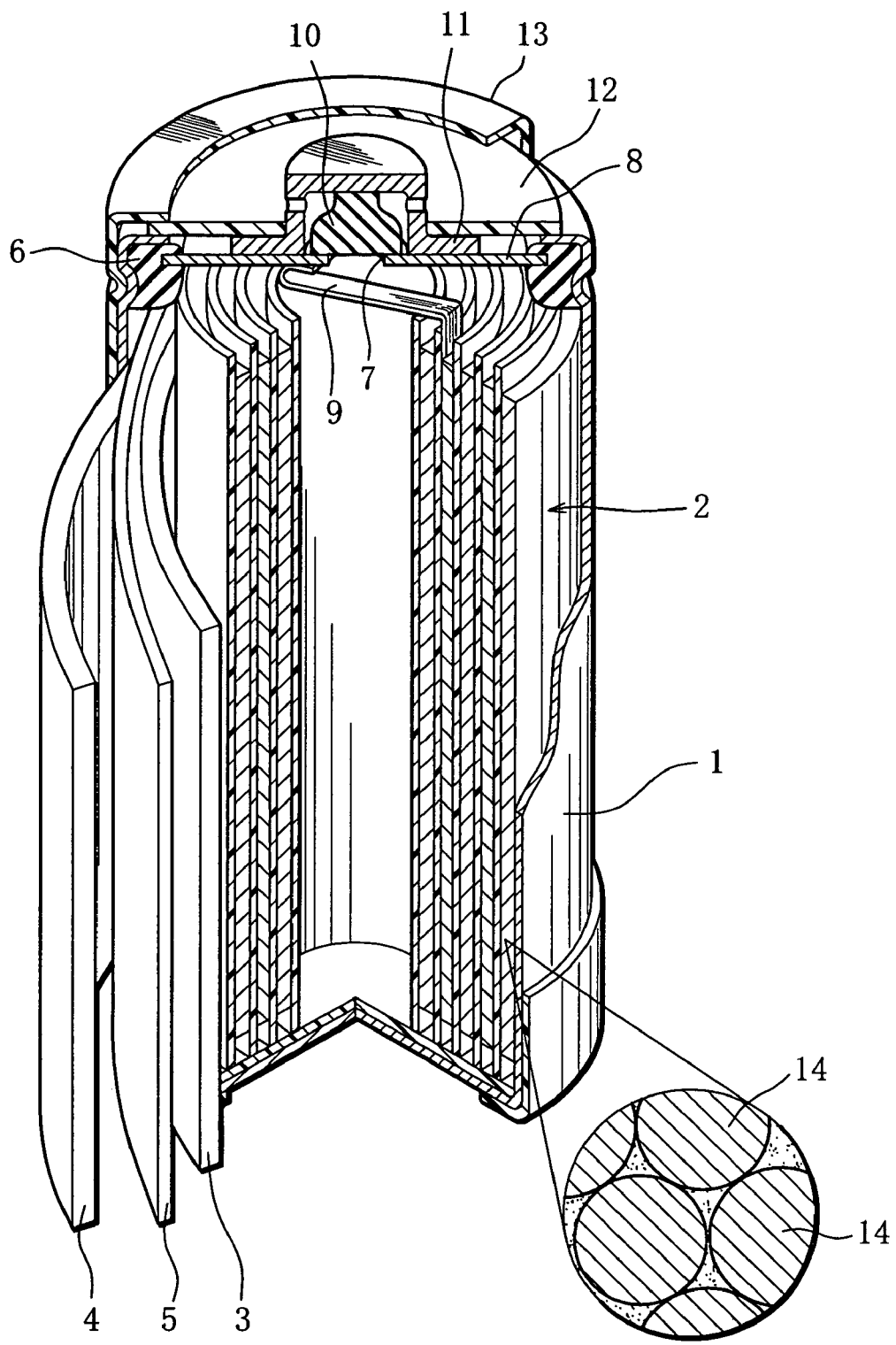

ALKALINE STORAGE CELL AND HYDROGEN STORAGE ALLOY FOR NEGATIVE ELECTRODE OF ALKALINE STORAGE CELL

BACKGROUND OF THE INVENTION

1. Field of the Invention

This invention relates to an alkaline storage cell and a hydrogen storage alloy for the negative electrode of the alkaline storage cell.

2. Description of the Related Art

There is a great demand for the alkaline storage cell using a hydrogen storage alloy for the negative electrode, for consumer use, because of its characteristics such that it has a high capacity and that it is cleaner compared with cells using lead or cadmium.

For this type of alkaline storage cell, $AB_5$-type ($CaCu_5$-type) hydrogen storage alloy such as $LaNi_5$ is generally used. However, the discharge capacity of the cell using this type of alloy already exceeds 80% of the theoretical capacity, so that the possibility of further enhancing the capacity is limited.

Thus, in order to enhance the capacity, the development of an alkaline storage cell using rare earth-Mg—Ni hydrogen storage alloy obtained by replacing the rare-earth elements in the $AB_5$-type hydrogen storage alloy partly with Mg has been being advanced. While this type of hydrogen storage alloy can store a large amount of hydrogen, it has problems that it does not easily release the hydrogen stored, and that the corrosion resistance to the alkaline electrolyte is low. Due to these problems, the alkaline storage cell using rare earth-Mg—Ni hydrogen storage alloy for the negative electrode has problems that the discharge characteristic is not good and that the cycle life is short.

In this connection, Japanese Unexamined Patent Publication No. 2002-164045 discloses a rare earth-Mg—Ni hydrogen storage alloy of composition expressed by the following general expression and conditional expression:

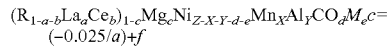

where R represents at least one element chosen from a group consisting of Ca and the rare-earth elements including Y (except for La and Ce), M represents at least one element chosen from a group consisting of Fe, Ga, Zn, Sn, Cu, Si, B, Ti, Zr, Nb, W, Mo, V, Cr, Ta, Li, P and S, and atom ratios a, b, c, d, e, f, X, Y and Z are defined as $0<a\leq 0.45$, $0\leq b\leq 0.2$, $0.1\leq c\leq 0.24$, $0\leq X\leq 0.1$, $0.02\leq Y\leq 0.2$, $0\leq d\leq 0.5$, $0\leq e\leq 0.1$, $3.2\leq Z\leq 3.8$ and $0.2\leq f\leq 0.29$.

Regarding this hydrogen storage alloy, it is thought that when the relationship $c=('10.025/a)+f$ is satisfied in the general expression, hydrogen is easily released, which leads to an improvement of the discharge characteristic of the alkaline storage cell. Further, it is thought that due to this relationship, precipitation of undesired crystal phases except for $Ce_2Ni_7$ structure, $CeNi_3$ structure and structures similar to these is suppressed and a decrease in the amount of hydrogen stored is prevented, which leads to an improvement of the cycle-life characteristic of the alkaline storage cell.

Further, in this hydrogen storage alloy, by setting Y indicating the proportion of Al to be greater than or equal to 0.02 in the general expression, the oxidation of the alloy is suppressed, while in order to suppress the precipitation of undesired crystal phases, Y is set to be less than or equal to 0.2.

However, also the rare earth-Mg—Ni hydrogen storage alloy disclosed in Japanese Unexamined Patent Publication No. 2002-164045 is not sufficient in the hydrogen release property, the corrosion resistance to the alkaline electrolyte, and the oxidation resistance. Thus, an improvement of the discharge characteristic and cycle characteristic of the alkaline storage cell using rare earth-Mg—Ni hydrogen storage alloy is desired.

SUMMARY OF THE INVENTION

The primary object of this invention is to provide a high-capacity alkaline storage cell which contains a rare earth-Mg—Ni hydrogen storage alloy having a good hydrogen release property, high corrosion resistance to the alkaline electrolyte and high oxidation resistance, and which has a good discharge characteristic and a good cycle characteristic.

In order to achieve the above object, this invention provides an alkaline storage cell comprising a positive electrode, an alkaline electrolyte, and a negative electrode containing a hydrogen storage alloy, the hydrogen storage alloy having a composition expressed by a general expression:

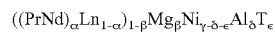

(where Ln represents at least one element chosen from a group consisting of La, Ce, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$, $\delta$ and $\epsilon$ represent numerical values which satisfy $0.7<\alpha$, $0.05<\beta<0.15$, $3.0\leq\gamma\leq 4.2$, $0.15\leq\delta\leq 0.30$ and $0\leq\epsilon\leq 0.20$).

The alkaline storage cell according to this invention is suited to enhance the capacity, since the hydrogen storage alloy in the negative electrode comprises a rare earth-Mg—Ni hydrogen storage alloy.

Further, the alkaline storage cell according to this invention has a good cycle characteristic and a good discharge characteristic. This comes from the feature that the subscript $\delta$, which indicates the proportion of Al in the hydrogen storage alloy contained in the negative electrode of the cell, is greater than or equal to 0.15. Specifically, since the proportion of Al is higher compared with the conventional case, the crystal structure of the hydrogen storage alloy is stabilized and the corrosion resistance to the alkaline electrolyte and the oxidation resistance are improved, so that the cell has an improved cycle characteristic.

The subscript $\delta$ is allowed to be set to be greater than or equal to 0.15 like this, since the subscript $\beta$, which indicates the proportion of Mg in the hydrogen storage alloy contained in the negative electrode of the cell, is in the range $0.05<\beta<0.15$ and the subscript $\alpha$, which indicates the total proportion of Pr and Nd at the A site of the hydrogen storage alloy, is greater than 0.7.

Specifically, in this hydrogen storage alloy, by setting the proportion of Mg and the proportion of Pr and Nd to be in the above-mentioned respective ranges, the solid solubility limit for Al in the hydrogen storage alloy is raised. Thus, the proportion of Al in the hydrogen storage alloy can be increased compared with the conventional case, without precipitating an undesired phase containing Al as a major constituent. It is to be noted that even when the proportion of Mg and the proportion of Pr and Nd are set to be in the above-mentioned respective ranges, if the subscript $\delta$ exceeds 0.30, an undesired phase containing Al as a major constituent is precipitated. Thus, the subscript $\delta$ is set to be less than or equal to 0.30.

Further, in this hydrogen storage alloy, by setting the proportion of Pr and Nd to be in the above-mentioned range, the hydrogen equilibrium pressure is increased compared with the conventional case. With this increase of the hydrogen equilibrium pressure, the operating voltage of the cell increases. Consequently, the cell has an improved discharge characteristic.

In order to achieve the above object, this invention provides a hydrogen storage alloy for a negative electrode of an alkaline storage cell, the hydrogen storage alloy having a composition expressed by a general expression:

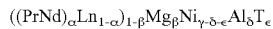

$$((PrNd)_\alpha Ln_{1-\alpha})_{1-\beta} Mg_\beta Ni_{\gamma-\delta-\epsilon} Al_\delta T_\epsilon$$

(where Ln represents at least one element chosen from a group consisting of La, Ce, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$, $\delta$ and $\epsilon$ represent numerical values which satisfy $0.7<\alpha$, $0.05<\beta<0.15$, $3.0\leq\gamma\leq4.2$, $0.15\leq\delta\leq0.30$ and $0\leq\epsilon\leq0.20$)

BRIEF DESCRIPTION OF THE DRAWING

The present invention will become more fully understood from the detailed description given hereinbelow and the accompanying drawing which is given by way of illustration only, and thus, is not limitative of the present invention, and wherein:

The FIGURE is a perspective cutaway view showing a nickel-hydrogen storage cell as an embodiment of this invention, where, within the circle, part of cross-section of a negative electrode is schematically shown on an enlarged scale.

DETAILED DESCRIPTION

Through the studies conducted in order to achieve the above object, the inventor confirmed that when the proportion of Al in the hydrogen storage alloy is increased compared with the conventional case, an undesired phase containing Al as a major constituent is precipitated, and found out that the precipitation of such undesired phase correlates with the proportion of Mg in the hydrogen storage alloy and the total proportion of Pr and Nd at the A site of the hydrogen storage alloy. Thus, the inventor acquired the knowledge that by setting the proportion of Mg and the proportion of Pr and Nd in the hydrogen storage alloy to be in specified ranges, respectively, the proportion of Al can be increased without precipitating an undesired phase, so that not only the corrosion resistance and oxidation resistance but also the discharge characteristic can be improved, and on the basis of this knowledge, reached the present invention.

The FIGURE shows a nickel-hydrogen storage cell as an embodiment of this invention.

This cell has an exterior can 1 in the form of a cylinder closed at the bottom and open at the top. The exterior can 1 contains an electrode assembly 2. The electrode assembly 2 consists of a positive electrode 3, a negative electrode 4 and a separator 5, which are rolled up with the separator 5 inserted between the positive and negative electrodes 3, 4. The outermost cylindrical part of the electrode assembly 2 is formed by the outer end part of the negative electrode 4 viewed in the direction of rolling-up, and the negative electrode 4 is electrically connected with the inner wall surface of the exterior can 1. The exterior can 1 also contains an alkaline electrolyte not shown.

For the alkaline electrolyte, a mixture of an aqueous potassium hydroxide solution and an aqueous sodium hydroxide solution, an aqueous lithium hydroxide solution or the like can be used, for example.

Within the opening at the top of the exterior can 1, a disk-shaped cover plate 8 with a gas release hole 7 in the center is arranged with a ring-shaped insulating gasket 6. The insulating gasket 6 and the cover plate 8 are fixed by crimping the rim at the open end of the exterior can 1. A positive-electrode lead 9 is arranged between the positive electrode 3 of the electrode assembly 2 and the inner surface of the cover plate 8 to connect them electrically. On the outer surface of the cover plate 8, a valve body 10 of rubber is arranged to close the gas release hole 7, and further a positive-electrode terminal 11 in the form of a cylinder with a flange is fitted to cover the valve body 10.

Further, an annular insulating plate 12 is arranged on the edge at the open end of the exterior can 1, and the positive-electrode terminal 11 projects through the insulating plate 12 outward. Reference sign 13 indicates an exterior tube. The exterior tube 13 covers the peripheral part of the insulating plate 12, the outer cylindrical surface of the exterior can 1 and the peripheral part of the bottom of the exterior can 1.

The positive electrode 3 and the negative electrode 4 will be described below more in detail.

The positive electrode 3 consists of a conductive positive-electrode substrate and a positive-electrode mixture supported by the positive-electrode substrate. For the positive-electrode substrate, a net-, sponge-, fiber- or felt-like porous metal material plated with nickel can be used, for example.

The positive-electrode mixture comprises nickel hydroxide powder as a positive-electrode active material, an additive and a binding agent, where desirably, the nickel hydroxide powder is such that the average valence of nickel is greater than 2 and that the surface of each particle of nickel hydroxide powder is wholly or at least partly covered with a cobalt compound. The nickel hydroxide powder may be a solid solution containing cobalt and zinc.

For the conducting agent, powder of cobalt oxide, cobalt hydroxide, metal cobalt or the like can be used, for example. For the binding agent, carboxymethylcellulose, methylcellulose, PTFE dispersion, HPC dispersion or the like can be used, for example.

The positive electrode 3 can be made, for example, by applying a positive-electrode slurry to a positive-electrode substrate, drying the positive-electrode substrate, and then rolling and cutting the positive-electrode substrate. The positive-electrode slurry is prepared by mixing and kneading the nickel hydroxide powder, the conducting agent, the binding agent and water.

The negative electrode 4 consists of a conductive negative-electrode substrate and a negative-electrode mixture supported by the negative-electrode substrate. For the negative-electrode substrate, punching metal can be used, for example.

The negative-electrode mixture comprises hydrogen storage alloy powder, a binding agent, and when necessary, a conducting agent. For the binding agent, the same substance as that used for the positive-electrode mixture can be used, where another substance such as sodium polyacrylate can be used together. For the conducting agent, carbon powder can be used, for example. Within the circle of the FIGURE, particles 14 of hydrogen storage alloy powder are shown schematically.

The hydrogen storage alloy powder for the negative electrode 4 comprises a rare earth-Mg—Ni hydrogen storage alloy of composition expressed by general expression (I): $((PrNd)_\alpha Ln_{1-\alpha})_{1-\beta} Mg_\beta Ni_{\gamma-\delta-\epsilon} Al_\delta T_\epsilon$, where Ln represents at least one element chosen from a group consisting of La, Ce, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$, $\delta$ and $\epsilon$ represent numerical values which satisfy $0.7 < \alpha$, $0.05 < \beta < 0.15$, $3.0 \leq \gamma \leq 4.2$, $0.15 \leq \delta \leq 0.30$ and $0 \leq \epsilon \leq 0.20$.

The subscript $\alpha$ indicates the total proportion of Pr and Nd in the hydrogen storage alloy, where the hydrogen storage alloy may contain only one of Pr and Nd without the other.

The negative electrode 4 can be made, for example, by applying a negative-electrode slurry to a negative-electrode substrate, drying the negative-electrode substrate, and then rolling and cutting the negative-electrode substrate. The negative-electrode slurry is prepared by mixing and kneading the hydrogen storage alloy powder, a binding agent, water, and when necessary, a conducting agent.

The hydrogen storage alloy powder is made, for example, as follows:

First, metal materials are measured out to produce the composition expressed by general expression (I) and mixed. The mixture is melted, for example, in a high-frequency melting furnace and formed into an ingot. The ingot obtained is subjected to heat treatment in which the ingot is heated at temperatures 900 to 1200° C. in an inert gas atmosphere for 5 to 24 hours to thereby change the crystal structure of the ingot to a $Ce_2Ni_7$-type structure or a structure similar to it, or in other words, to a superlattice structure such that $AB_5$-type structure and $AB_2$-type structure are merged. Then, the ingot is pulverized and the particles obtained are sieved to separate those of desired particle size as hydrogen storage alloy powder.

The above-described nickel-hydrogen storage cell is suited to enhance the capacity, since the hydrogen storage alloy for the negative electrode comprises a rare earth-Mg—Ni hydrogen storage alloy of composition expressed by general expression (I), which stores a large amount of hydrogen at room temperature.

Further, this nickel-hydrogen storage cell has a good cycle characteristic and a good discharge characteristic. This comes from the feature that the subscript $\delta$, which indicates the proportion of Al in the hydrogen storage alloy contained in the negative electrode of the cell, is greater than or equal to 0.15. Specifically, due to the increased proportion of Al compared with the conventional case, the crystal structure of the hydrogen storage alloy is stabilized and the corrosion resistance to the alkaline electrolyte and the oxidation resistance are improved, so that the cell has an improved cycle characteristic.

The subscript $\delta$ is allowed to be set to be greater than or equal to 0.15 like this, since the subscript $\beta$, which indicates the proportion of Mg in the hydrogen storage alloy contained in the negative electrode of the cell, is in the range $0.05 < \beta < 0.15$ and since the subscript $\alpha$, which indicates the total proportion of Pr and Nd at the A site of the hydrogen storage alloy, is greater than 0.7.

Specifically, in this hydrogen storage alloy, by setting the proportion of Mg and the proportion of Pr and Nd to be in the above-mentioned respective ranges, the solid solubility limit for Al in the hydrogen storage alloy is raised. Thus, the proportion of Al in the hydrogen storage alloy can be increased compared with the conventional case, without precipitating an undesired phase containing Al as a major constituent. It is to be noted that even when the proportion of Mg and the proportion of Pr and Nd are set to be in the above-mentioned respective ranges, if the subscript $\delta$ exceeds 0.30, an undesired phase containing Al as a major constituent is precipitated. Thus, the subscript $\delta$ is set to be less than or equal to 0.30.

Further, in this hydrogen storage alloy, by setting the proportion of Pr and Nd to be in the above-mentioned range, the hydrogen equilibrium pressure is increased. With this increase of the hydrogen equilibrium pressure, the operating voltage of the cell increases. Consequently, the cell has an improved discharge characteristic.

It is to be noted that in the above-described nickel-hydrogen storage cell, by setting the subscript $\beta$ in general expression (I) to be less than or equal to 0.15, the precipitation of an undesired phase containing Mg as a major constituent is prevented. Also for this reason, the cell has an improved discharge characteristic. Specifically, since the subscript $\beta$ is less than or equal to 0.15, microparticulation of the hydrogen storage alloy powder due to the repetition of the charge/discharge cycle is suppressed. Thus, the cell has an improved cycle characteristic. Meanwhile, since the subscript $\beta$ is set to be greater than or equal to 0.05, the hydrogen storage alloy can store a large amount of hydrogen.

In general expression (I), if the subscript $\gamma$ is too small, the storage stability of hydrogen stored in the hydrogen storage alloy increases, so that the hydrogen release capacity lowers. Meanwhile, if the subscript $\gamma$ is too large, the number of hydrogen storage sites in the hydrogen storage alloy decreases, so that the hydrogen storage capacity begins to lower. Thus, the subscript $\gamma$ is set to satisfy the condition $3.0 \leq \gamma \leq 4.2$.

In general expression (I), the subscript $\epsilon$ indicates the amount of the substitute element T by which Ni is replaced. If the subscript $\epsilon$ is too large, the crystal structure of the hydrogen storage alloy changes. Thus, the hydrogen storage alloy begins to lose the hydrogen storage-release capacity, and the substitute element T begins to dissolve into the alkaline electrolyte and form a compound. The compound is deposited on the separator, so that the long-period preservation quality of the cell lowers. Thus, the subscript $\epsilon$ is set to satisfy the condition $0 \leq \epsilon \leq 0.20$.

EXAMPLES

Example 1

1. Preparation of a Negative Electrode

Metal materials were measured out to produce the composition $(La_{0.10}Ce_{0.05}Pr_{0.35}Nd_{0.50})_{0.90}Mg_{0.10}Ni_{3.20}Al_{0.22}$ and mixed. The mixture was melted in a high-frequency melting furnace and formed into an ingot. The ingot was heated in an argon atmosphere of temperature 1000° C. for 10 hours to thereby change the crystal structure of the ingot to a $Ce_2Ni_7$-type structure or a structure similar to it. Then, the ingot was mechanically pulverized in an inert gas atmosphere and sieved to thereby obtain rare earth-Mg—Ni hydrogen storage alloy powder having the above composition. The average particle size corresponding to weight integral 50% of the rare earth-Mg—Ni hydrogen storage alloy powder obtained, measured using a laser diffraction-scattering particle-size distribution measurement device, was 50 μm.

To 100 mass-parts of the alloy powder obtained, 0.5 mass-parts of sodium polyacrylate, 0.12 mass-parts of carboxymethylcellulose and 0.5 mass-parts (solid basis) of PTFE dispersion (medium: water, specific gravity 1.5, 60 mass % of solids), 1.0 mass-part of carbon black and 30 mass-parts of water were added, and all the materials were mixed to thereby obtain negative-electrode slurry. A nickel punching sheet coated with the negative-electrode slurry was dried, then rolled and cut to thereby obtain a negative electrode for size AA.

2. Preparation of a Positive Electrode

Nickel hydroxide powder consisting of particles wholly or partly covered with a cobalt compound was prepared. This nickel hydroxide powder was mixed with 40 mass % HPC dispersion to thereby obtain positive-electrode slurry. A nickel porous sheet packed and coated with this positive-electrode slurry was dried and then rolled and cut to thereby obtain a positive electrode.

3. Assembly of a Nickel-Hydrogen Secondary Cell

The negative electrode and positive electrode obtained were rolled up with a separator of polypropylene fiber non-woven fabric, thickness 0.1 mm and weight per unit area 40 g/m$^2$ inserted therebetween, to thereby form an electrode assembly. After the electrode assembly obtained was put in an exterior can and a determined fitting process was performed, an alkaline electrolyte made of a 7N aqueous potassium hydroxide solution and a 1N aqueous lithium hydroxide solution was introduced into the exterior can. By sealing the open end of the exterior can using a cover plate, etc., a sealed cylindrical nickel-hydrogen storage cell of rating capacity 2500 mAh and size AA was obtained as example 1.

For the cell constructed, an initial activation process was performed, in which the cell was charged with a 0.1 It charging current in an environment of temperature 25° C. for 15 hours, and then discharged with a 0.2 It discharge current up to the termination voltage 1.0V.

Examples 2 to 4 and Comparative Examples 1 to 5

Nickel-hydrogen storage cells as examples 2 to 4 and comparative examples 1 to 5 were constructed in the same way as example 1, except that hydrogen storage alloys of composition shown in table 1 were used, respectively, and the initial activation process was performed thereon.

4. Evaluation of Cells and Hydrogen Storage Alloys

Regarding the nickel-hydrogen storage cells of examples 1 to 4 and comparative examples 1 to 5 which had undergone the initial activation process, the following tests were performed.

1) Cycle Characteristic

For each cell, in an environment of temperature 25° C., the charge/discharge cycle consisting of dV-controlled charging with a 1.0 It charging current, 60 minutes' rest and discharging with a 1.0 It discharge current up to the termination voltage 0.5V was repeated 300 times. In the first and 300th cycles, the discharge capacity was measured, and the percentage of the discharge capacity in the 300th cycle relative to the discharge capacity in the first cycle was obtained. The results of this test were also shown in Table 1.

(2) Discharge Characteristic

In an environment of temperature 25° C., each cell was charged with a 1.0 It charging current under dV control, and then after a 60 minutes' rest, discharged with a 1.0 It discharge current up to the termination voltage 0.5V. Further, each cell was charged and left at rest in the same way, and then discharged with a 3.0 It discharge current up to the termination voltage 0.5V. In each discharge process, the discharge capacity was measured, and the percentage of the discharge capacity in discharging with a 3.0 It discharge current relative to the discharge capacity in discharging with a 1.0 It discharge current was obtained. The results of this test were also shown in Table 1.

It is to be noted that regarding the cell of comparative example 2, since the alkaline electrolyte leaked during the initial activation process, the cycle characteristic and discharge characteristic were not able to be measured.

(3) Al Precipitation Rate in Hydrogen Storage Alloy

Regarding each of the hydrogen storage alloys used in examples 1 to 4 and comparative examples 1 to 5, a small piece of the hydrogen storage alloy was embedded in resin and polished. On the polished cross-section of the piece, element mapping using an EPMA (electron probe microanalyzer) was performed. On the basis of the Al map obtained, the percentage of the area of regions where Al was precipitated (precipitated phase) relative to the area of regions where Al was not precipitated (parent phase) was obtained as an Al precipitation rate. The results of this test were also shown in Table 1.

TABLE 1

| | Hydrogen storage alloy | | Al precipitation rate (%) | Cell evaluation | |
|---|---|---|---|---|---|
| | Composition | Pr + Nd (Subsciript α) | | Cycle characteristic (%) | Discharge characteristic (%) |
| Example 1 | $(La_{0.10}Ce_{0.05}Pr_{0.35}Nd_{0.50})_{0.90}Mg_{0.10}Ni_{3.20}Al_{0.22}$ | 0.85 | 2 | 94 | 77 |
| Example 2 | $(La_{0.20}Ce_{0.08}Pr_{0.32}Nd_{0.40})_{0.90}Mg_{0.10}Ni_{3.20}Al_{0.22}$ | 0.72 | 3 | 90 | 73 |
| Comp. ex. 1 | $(La_{0.40}Ce_{0.10}Pr_{0.20}Nd_{0.30})_{0.90}Mg_{0.10}Ni_{3.20}Al_{0.22}$ | 0.50 | 13 | 58 | 62 |
| Example 3 | $(La_{0.10}Ce_{0.05}Pr_{0.35}Nd_{0.50})_{0.92}Mg_{0.08}Ni_{3.30}Al_{0.22}$ | 0.85 | 2 | 91 | 72 |
| Comp. ex. 2 | $(La_{0.10}Ce_{0.05}Pr_{0.35}Nd_{0.50})_{0.97}Mg_{0.03}Ni_{3.20}Al_{0.22}$ | 0.85 | 2 | — | — |
| Comp. ex. 3 | $(La_{0.10}Ce_{0.05}Pr_{0.35}Nd_{0.50})_{0.75}Mg_{0.25}Ni_{3.20}Al_{0.22}$ | 0.85 | 2 | 45 | 77 |
| Example 4 | $(La_{0.10}Ce_{0.05}Pr_{0.35}Nd_{0.50})_{0.90}Mg_{0.10}Ni_{3.20}Al_{0.27}$ | 0.85 | 5 | 92 | 72 |
| Comp. ex. 4 | $(La_{0.10}Ce_{0.05}Pr_{0.35}Nd_{0.50})_{0.90}Mg_{0.10}Ni_{3.10}Al_{0.35}$ | 0.85 | 18 | 55 | 53 |
| Comp. ex. 5 | $(La_{0.10}Ce_{0.05}Pr_{0.35}Nd_{0.50})_{0.90}Mg_{0.10}Ni_{3.25}Al_{0.05}$ | 0.85 | 1 | 12 | 62 |

From Table 1, the following are clear:

(1) In comparison between examples 1, 4 and comparative example 5, examples 1, 4 are better than comparative example 5 in respect of the cycle characteristic and discharge characteristic, and prominently better in respect of the cycle characteristic in particular. The reason for this is thought to be that by setting the subscript δ, which indicates the proportion of Al in the hydrogen storage alloy, to be greater than or equal to 0.15, the crystal structure of the hydrogen storage alloy was stabilized, and the deterioration of the crystal structure with the repetition of the charge/discharge cycle and the lowering in hydrogen storage capacity due to this were suppressed, or in other words, the corrosion resistance to the alkaline electrolyte and oxidation resistance of the hydrogen storage alloy were improved.

Incidentally, another cause of the inferior discharge characteristic of comparative example 5 is thought to be that the oxidation resistance lowered to a great degree and thereby a large amount of the electrolyte was consumed, so that the internal resistance increased.

Thus, the subscript δ is set to be greater than or equal to 0.15.

(2) In comparison between examples 1, 2 and comparative example 1, although the proportion of Al in the hydrogen storage alloy is the same (δ=0.22), the Al precipitation rates in examples 1, 2 are lower than the Al precipitation rate in comparative example 1. Further, examples 1, 2 in which the Al precipitation rate is low are better than comparative example 1 in respect of the cycle characteristic and discharge characteristic.

The reason for this is thought to be that only by setting the subscript δ to be greater than or equal to 0.15, the precipitation of Al was not suppressed, so that the cycle characteristic and discharge characteristic of the cell were not improved. It is thought that in addition to setting the subscript δ like this, by setting the subscript α, which indicates the total proportion of Pr and Nd in the hydrogen storage alloy, to be greater than 0.7, the solid solubility limit for Al in the hydrogen storage alloy was raised and the hydrogen equilibrium pressure was increased, so that the precipitation of Al was suppressed and the cycle characteristic and discharge characteristic of the cell were improved.

Thus, the subscript ax is set to be greater than 0.7. (3) In comparison between example 4 and comparative example 4, the proportion of Al in the hydrogen storage. alloy of example 4 is lower than the proportion of Al in the hydrogen storage alloy of comparative example 4. However, even taking this into consideration, the Al precipitation rate in example 4 is prominently lower than the Al precipitation rate in comparative example 4. Further, example 4 in which the Al precipitation rate is lower is better than comparative example 4 in respect of the cycle characteristic and discharge characteristic.

This shows that even when the solid solubility limit for Al is raised by setting the subscript α to be greater than 0.7, if the subscript 6 exceeds 0.30, the Al precipitation rate increases.

Thus, the subscript δ is set to be less than or equal to 0.30.

(4) In the cell of comparative example 2, the alkaline electrolyte leaked during the initial activation process. This happened since the hydrogen storage alloy in the negative electrode was not able to absorb hydrogen produced at the positive electrode. Meanwhile, in the cell of example 3, leaking of the alkaline electrolyte did not happen.

Thus, in order to impart a sufficient hydrogen storage capacity to the hydrogen storage alloy, the subscript β is set to be greater than or equal to 0.05.

(5) In comparison between example 1 and comparative example 3, in respect of the discharge characteristic, no difference is recognized between them, while in respect of the cycle characteristic, example 1 is prominently better than comparative example 3.

The reason for this is thought to be that in the case of comparative example 3 in which the subscript β, which indicates the proportion of Mg in the hydrogen storage alloy, exceeds 0.15, the hydrogen storage alloy deteriorated with the repetition of the charge/discharge cycle, or in other words, microparticulation of the hydrogen storage alloy powder progressed and the surfaces which became exposed due to the microparticulation (fresh surfaces) corroded due to contact with the alkaline electrolyte.

Thus, the subscript β is set to be less than 0.15.

The present invention is not limited to the above-described embodiment and examples but various modifications can be made. The cell can be a rectangular cell, and the mechanical structure is not limited in particular.

In the described embodiment, Ln represents at least one element chosen from a group consisting of La, Ce, Pm, Sm, Eu, Gd, Tb, Dy, Ho, Er, Tm, Yb, Lu, Ca, Sr, Sc, Y, Ti, Zr and Hf, where if Ce is chosen for Ln, it is desirable that the atomic ratio of Ce relative to the sum of Pr, Nr and Ln should not exceed 0.2. This is because if the atomic ratio of Ce exceeds 0.2, the hydrogen storage capacity of the hydrogen storage alloy lowers.

In the described embodiment, the subscript α is greater than 0.7, where desirably, it is greater than 0.75, and more desirably, greater than 0.80. It is to be noted that the maximum value of the subscript a can be 1.

In the described embodiment, the subscript β is in the range $0.05 < \beta < 0.15$, where desirably, it is in the range $0.07 \leq \beta \leq 0.14$, and more desirably, in the range $0.08 < \beta < 0.12$.

In the described embodiment, the subscript γ is in the range $3.0 \leq \gamma \leq 4.2$, where desirably, it is in the range $3.2 \leq \gamma \leq 3.8$, and more desirably, in the range $3.3 \leq \gamma \leq 3.7$.

In the described embodiment, the subscript δ is in the range $0.15 \leq \delta \leq 0.30$, where desirably, it is in the range $0.17 \leq \delta \leq 0.27$, and more desirably, in the range $0.20 \leq \delta \leq 0.25$.

In the described embodiment, the subscript ε is in the range $0 \leq \epsilon \leq 0.20$, where desirably, it is in the range $0 \leq \epsilon \leq 0.15$, and more desirably, in the range $0 \leq \epsilon \leq 0.10$.

In the described embodiment, the negative-electrode mixture comprises hydrogen storage alloy powder, a binding agent, and when necessary, a conducting agent, where desirably, the negative-electrode mixture further contains additive powder of $Al(OH)_3$. The reason for this is as follows:

The rare earth-Mg—Ni hydrogen storage alloy of composition expressed by general expression (I) has a high corrosion resistance to the alkaline electrolyte and a high oxidation resistance. Thus, in the nickel-hydrogen storage cell using this hydrogen storage alloy, Al contained in the hydrogen storage alloy does not easily dissolve into the alkaline electrolyte.

Thus, it is desirable that apart from Al contained in the hydrogen storage alloy, the negative electrode of this nickel-hydrogen storage cell should contain $Al(OH)_3$ as an additive, even though the proportion of Al in the hydrogen storage alloy is high. In the alkaline electrolyte, $Al(OH)_3$ forms a gel compound, and the gel compound distributed near the positive electrode increases the oxygen overpotential of the nickel hydroxide powder which is the positive-electrode active material, thereby preventing self reduction of the nickel hydroxide powder. Consequently, self discharge of the nickel-hydrogen storage cell during preservation is prevented.

Further, while the cell is preserved, since the self discharge is prevented by the gel compound, the nickel hydroxide powder is prevented from being reduced excessively, to an irreversible level. Consequently, decrease in capacity of the nickel-hydrogen storage cell through preservation is suppressed.

Finally, the alkaline storage cell according to the present invention can be applied not only to the nickel-hydrogen storage cell but also to an alkaline storage cell whose negative electrode contains the hydrogen storage alloy powder.

The invention thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. An alkaline storage cell comprising:
   a positive electrode;
   an alkaline electrolyte; and
   a negative electrode containing a hydrogen storage alloy, the hydrogen storage alloy having a composition expressed by a general expression:

$$((PrNd)_\alpha Ln_{1-\alpha})_{1-\beta} Mg_\beta Ni_{\gamma-\delta-\epsilon} Al_\delta T_\epsilon$$

(where Ln represents at least one element chosen from a group consisting of La, Ce, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$, $\delta$ and $\epsilon$ represent numerical values which satisfy $0.7<\alpha\leq1$, $0.08<\beta<12$, $3.0\leq\gamma\leq4.2$, $0.15\leq\delta\leq0.30$ and $0\leq\epsilon\leq0.20$.

2. The alkaline storage cell according to claim 1, wherein a in the expression is greater than 0.75.

3. The alkaline storage cell according to claim 2, wherein a in the expression is greater than 0.8.

4. The alkaline storage cell according to claim 1, wherein $\gamma$ in the expression is in a range $3.2\leq\gamma\leq3.8$.

5. The alkaline storage cell according to claim 4, wherein $\gamma$ in the expression is in a range $3.3\leq\gamma3.7$.

6. The alkaline storage cell according to claim 1, wherein $\delta$ in the expression is in a range $0.17\leq\gamma\leq0.27$.

7. The alkaline storage cell according to claim 6, wherein $\delta$ in the expression is in a range $0.20\leq\delta\leq0.25$.

8. The alkaline storage cell according to claim 1, wherein $\epsilon$ in the expression is in a range $0\leq\epsilon\leq0.15$.

9. The alkaline storage cell according to claim 8, wherein $\epsilon$ in the expression is in a range $0\leq\epsilon\leq0.10$.

10. The alkaline storage cell according to claim 1, wherein the negative electrode further includes additive powder, the additive powder containing $Al(OH)_3$.

11. A hydrogen storage alloy for a negative electrode of an alkaline storage cell, having composition expressed by a general expression:

$$((PrNd)_\alpha Ln_{1-\alpha})_{1-\beta} Mg_\beta Ni_{\gamma-\delta-\epsilon} Al_\delta T_\epsilon$$

(where Ln represents at least one element chosen from a group consisting of La, Ce, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$, $\delta$ and $\epsilon$ represent numerical values which satisfy $0.7<\alpha\leq1$, $0.08<\beta<0.12$, $3.0\leq\gamma\leq4.2$, $0.15\leq\delta\leq0.30$ and $0\leq\epsilon\leq0.20$.

12. The hydrogen storage alloy according to claim 11, wherein $\alpha$ in the expression is greater than 0.75.

13. The hydrogen storage alloy according to claim 12, wherein $\alpha$ in the expression is greater than 0.8.

14. The hydrogen storage alloy according to claim 11, wherein $\gamma$ in the expression is in a range $3.2\leq\gamma\leq3.8$.

15. The hydrogen storage alloy according to claim 11, wherein $\delta$ in the expression is in a range $0.17\leq\delta\leq0.27$.

16. The hydrogen storage alloy according to claim 11, wherein $\epsilon$ in the expression is in a range $0\leq\epsilon\leq0.15$.

* * * * *